United States Patent
Klockow et al.

(10) Patent No.: US 9,109,173 B2
(45) Date of Patent: Aug. 18, 2015

(54) GASIFICATION QUENCH CHAMBER DIP TUBE

(75) Inventors: Helge Burghard Herwig Klockow, Niskayuna, NY (US); Prashant Tiwari, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 477 days.

(21) Appl. No.: 12/957,276

(22) Filed: Nov. 30, 2010

(65) Prior Publication Data

US 2011/0120009 A1 May 26, 2011

Related U.S. Application Data (63) Continuation-in-part of application No. 12/495,439, filed on Jun. 30, 2009.

(51) Int. Cl.
| | |
|---|---|
| *B01J 7/00* | (2006.01) |
| *C10K 1/04* | (2006.01) |
| *B01D 47/02* | (2006.01) |
| *C10K 1/10* | (2006.01) |
| *C10J 3/48* | (2006.01) |
| *C10J 3/52* | (2006.01) |
| *C10J 3/84* | (2006.01) |
| *C10J 3/74* | (2006.01) |

(52) U.S. Cl.
CPC ............... *C10K 1/04* (2013.01); *B01D 47/021* (2013.01); *C10J 3/485* (2013.01); *C10J 3/526* (2013.01); *C10J 3/74* (2013.01); *C10J 3/84* (2013.01); *C10J 3/845* (2013.01); *C10K 1/101* (2013.01); *B01D 2247/105* (2013.01); *C10J 2300/093* (2013.01); *C10J 2300/0943* (2013.01); *C10J 2300/0959* (2013.01); *C10J 2300/0969* (2013.01); *C10J 2300/1603* (2013.01); *C10J 2300/1671* (2013.01); *C10J 2300/1675* (2013.01); *Y02E 20/18* (2013.01)

(58) Field of Classification Search
CPC .............. C10J 3/845; C10J 3/485; C10J 3/84; C10J 3/74; C10J 3/526; C10J 3/76; C10J 2200/09; C10J 3/506; C10J 3/466; C10K 1/101; B01D 47/021
See application file for complete search history.

(56) References Cited

U.S. PATENT DOCUMENTS

| | | | |
|---|---|---|---|
| 4,218,423 A | 8/1980 | Robin et al. | |
| 4,252,543 A | 2/1981 | Giles | |
| 4,444,726 A | 4/1984 | Crotty, Jr. et al. | |
| 4,474,584 A * | 10/1984 | Koog | 48/197 R |
| 4,479,808 A * | 10/1984 | Campbell | 48/76 |
| 4,605,423 A * | 8/1986 | Koog | 48/69 |

(Continued)

FOREIGN PATENT DOCUMENTS

| | | | |
|---|---|---|---|
| WO | 2009014802 A1 | 1/2009 | |
| WO | 2009042274 A1 | 4/2009 | |

*Primary Examiner* — Imran Akram
(74) *Attorney, Agent, or Firm* — Joseph J. Christian (57) ABSTRACT

A gasification quench chamber dip tube component is disclosed. The dip tube includes an elongate hollow element that has a first intake end and a second discharge end that is located distally opposite the intake end. The second discharge end includes either a plurality of elongate openings that are displaced circumferentially around the hollow element or a plurality of elongate elements displaced circumferentially around the hollow element thereby defining a plurality of elongate spaces therebetween that extend axially from the second discharge end. A quench chamber that employs the dip tube is also disclosed.

9 Claims, 8 Drawing Sheets

(56) References Cited

U.S. PATENT DOCUMENTS

| | | |
|---|---|---|
| 4,778,483 A | 10/1988 | Martin et al. |
| 4,828,579 A | 5/1989 | Becker et al. |
| 4,828,580 A | 5/1989 | Dach |
| 6,322,763 B1 * | 11/2001 | McDaniel .................. 423/242.1 |
| 7,090,707 B1 | 8/2006 | Barot |
| 2006/0260192 A1 | 11/2006 | Barot |
| 2008/0172941 A1 * | 7/2008 | Jancker et al. .................... 48/73 |
| 2008/0175770 A1 | 7/2008 | Wallace |
| 2008/0222955 A1 * | 9/2008 | Jancker et al. .................... 48/67 |
| 2009/0047193 A1 | 2/2009 | Corry et al. |
| 2009/0202403 A1 * | 8/2009 | Jimenez-Huyke et al. ... 422/198 |
| 2010/0313442 A1 * | 12/2010 | Russell et al. ................. 34/468 |
| 2010/0325956 A1 * | 12/2010 | Dinu et al. ....................... 48/85 |

* cited by examiner

GASIFICATION QUENCH CHAMBER DIP TUBE

CROSS-REFERENCE TO RELATED PATENT APPLICATIONS

This application is a Continuation in Part of co-pending U.S. patent application Ser. No. 12/495,439, entitled "GASIFICATION SYSTEM FLOW DAMPING", filed Jun. 30, 2009, which is hereby incorporated by reference in its entirety.

BACKGROUND

The invention relates generally to gasifiers, and more particularly to a quench chamber assembly for a gasifier and a dip tube positioned therein.

In a normal coal gasification process, wherein a particulated carbonaceous fuel such as coal or coke or a carbonaceous gas is burned, the process is carried out at relatively hot temperatures and high pressures in a combustion chamber. When injected fuel is burned or partially burned in the combustion chamber, an effluent is discharged through a port at a lower end of the combustion chamber to a quench chamber disposed downstream of the combustion chamber. The quench chamber contains a liquid coolant such as water. The effluent from the combustion chamber is contacted with the liquid coolant in the quench chamber, so as to reduce the temperature of the effluent.

When the fuel is a solid such as coal or coke, the gasifier arrangement permits a solid portion of the effluent, in the form of ash, to be retained in the liquid pool of the quench chamber, and subsequently to be discharged as slag slurry. A gaseous component of the effluent is discharged from the quench chamber for further processing.

A general trend in gasification systems is towards larger gasification components so as to increase throughput. Increasing the amount of syngas produced calls for the increase in size of each system component. With this concomitant increase in component size, one area of interest is the dynamic behavior of water in the quench chamber in conjunction with the gas flow resulting in syngas flow, pressure, and level fluctuations.

There is a need for an improved quench chamber assembly that improves on fluid dynamics of current quench chamber designs including the dip tube therein.

BRIEF DESCRIPTION

In accordance with one exemplary embodiment of the present invention, a gasification quench chamber component comprises: an elongate hollow element, having a first intake end and a second discharge end distally opposed thereon, wherein the second discharge end comprises one of: a plurality of elongate openings displaced circumferentially around the elongate hollow element; and a plurality of elongate elements displaced circumferentially around the elongate hollow element, thereby defining a plurality of elongate spaces therebetween, and extending axially from the second discharge end.

In accordance with another exemplary embodiment of the present invention, a gasification component comprises a quench chamber having a liquid coolant disposed therein; a dip tube configured to couple a combustion chamber to the quench chamber and configured to direct syngas from the combustion chamber to the quench chamber to contact the liquid coolant and produce a cooled syngas, further wherein the dip tube comprises a first intake end and a second discharge end distally opposed thereon, wherein the second discharge end comprises one of: a plurality of elongate openings displaced circumferentially around the elongate hollow element; and a plurality of elongate elements displaced circumferentially around the elongate hollow element, thereby defining a plurality of elongate spaces therebetween, and extending axially from the second discharge end.

In accordance with another exemplary embodiment of the present invention, a gasification quench chamber component comprises an elongate hollow element, having a first intake end and a second discharge end distally opposed thereon, wherein the second discharge end comprises a plurality of holes through the hollow element spaced circumferentially around the second discharge end.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for controlling flow dynamics within gasification system components, such as quench units and/or scrubbers. In general, quench units may receive hot effluent, such as syngas, from a gasification chamber. The hot effluent may be directed through a pool of cooling fluid within the quench unit to produce cooler, saturated (or partially saturated) syngas. Upon cooling, components, such as ash, may solidify within the pool of liquid for subsequent removal from the quench unit. From the quench unit, the cooler syngas may be directed to a scrubber. In generally, the syngas may flow through a pool of cooling fluid within the scrubber to remove any remaining particulates and/or entrained water from the syngas. During operation, the quench unit and/or the scrubber may experience flow fluctuations, such as fluctuations in cooling pool levels, gas flow rates, and/or pressure levels, which, in turn, may cause inefficient cooling or entrainment of cooling fluid within the syngas exiting the quench unit and/or the scrubber.

Accordingly, the present disclosure describes gasification system components, such as quench units and/or scrubbers, that include flow damping mechanisms designed to minimize flow fluctuations within the gasification system component. As used herein, the term "damping" may generally refer to reducing fluctuations or oscillations in flow and/or to reducing the intensity of flow oscillations. For example, the flow damping mechanisms may be designed to dissipate energy from flow fluctuations and/or to redirect uneven flow within the quench unit. In certain embodiments, the flow damping mechanisms may be disposed within the pool of liquid coolant to dampen fluctuations in the level of the pool, which in turn may reduce fluctuations in pressure and/or fluctuations in gas flow rate. For example, damping baffles may be disposed within the pool of liquid to restrict the flow area through the pool. In certain embodiments, the damping baffles may be designed to reduce the flow path area for the liquid by at least approximately fifty percent. The flow damping mechanisms also may be disposed within the gas flow path to control the pressure drop, which in turn may reduce fluctuations in the liquid pool levels and/or the gas flow rate.

Figure 1:
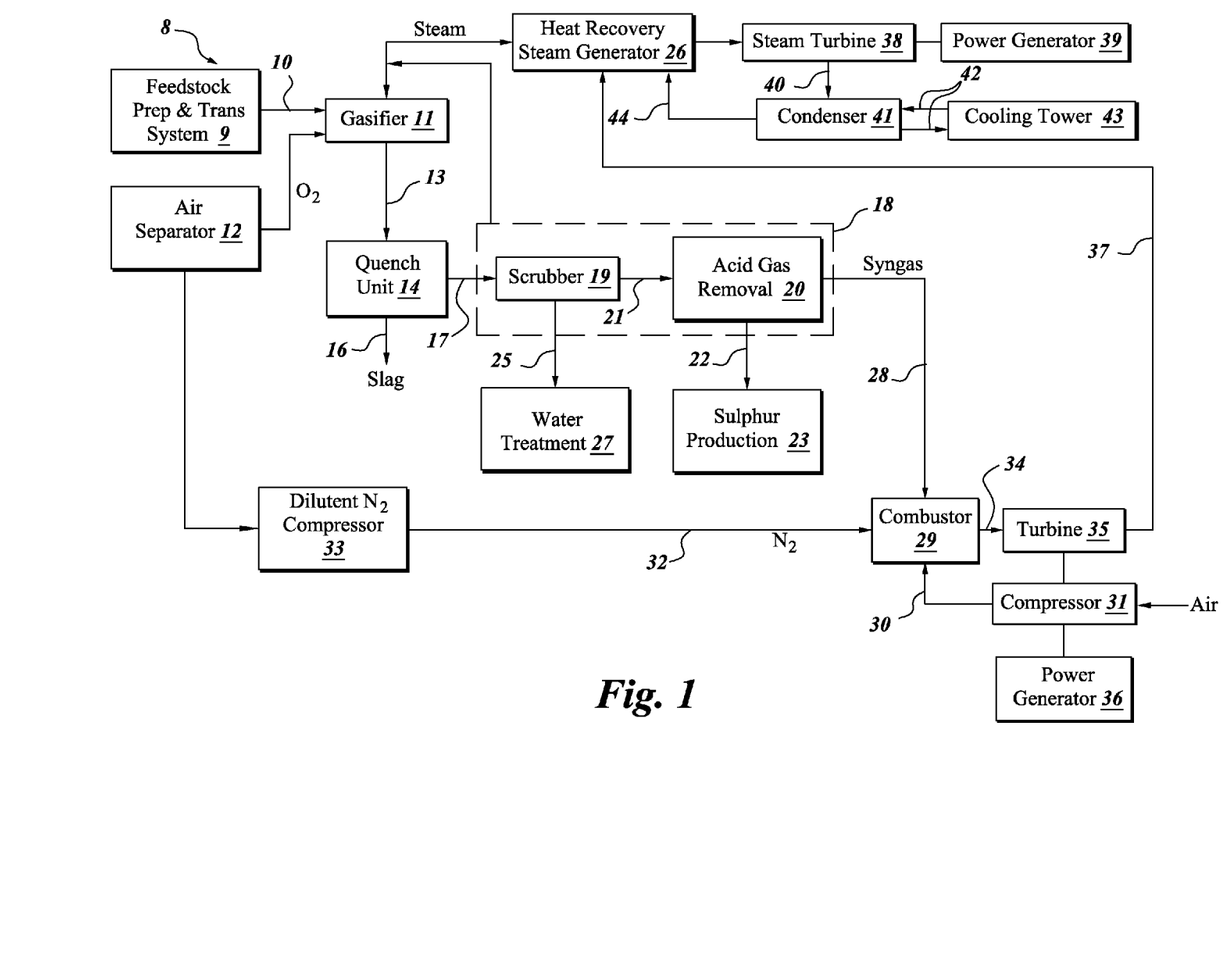
FIG. 1 is a block diagram of an embodiment of an integrated gasification combined cycle power generation system that may employ a quench unit and a scrubber.

FIG. 1 illustrates an embodiment of an integrated gasification combined cycle (IGCC) power generation system 8. Within the power generation system, gas, such as syngas, may be combusted to generate power within a "topping," or Brayton, cycle. Exhaust gas from the "topping" cycle may then be used to generate steam within a "bottoming," or Rankine, cycle.

To produce syngas, carbonaceous fuel, such as coke and lignite, may be introduced to the system 8 via a feedstock preparation and transportation system 9. The feed system 9 provides fuel slurry 10 to a gasifier 11, where the fuel is mixed with oxygen ($O_2$) and steam ($H_2O$). The oxygen may be provided from an air separator 12. The gasifier 11 heats the reactants to over approximately 700° C. in order to combust the volatile components in the fuel slurry to produce hot effluent, such as syngas 13. Due to chemical reactions between the oxygen, steam, and carbon (C), the syngas 13 may include hydrogen ($H_2$), carbon monoxide (CO), and carbon dioxide ($CO_2$) as well as other less desirable components, such as ash, sulfur, nitrogen, and chloride, present in the carbonaceous fuel.

From the gasifier 11, the syngas 13 may enter a quench unit 14. In certain embodiments, the quench unit 14 may be integral with the gasifier 11. However, in other embodiments, the quench unit 14 may be a separate unit. The quench unit 14 may cool the syngas 13 to at or near a saturation temperature through evaporation of a cooling fluid, such as water. During the cooling process, less desirable components, such as ash, may solidify and be removed from the quench unit 14 as slag 16. As the syngas 13 flows through the quench unit 14, the syngas 13 may be cooled to produce cooled syngas 17 that may exit the quench unit 14 and enter a gas cooling and treating system 18.

The gas cooling and treatment system 18 may include a scrubber 19 and an acid gas removal system 20, as well as other components. Within the gas cooling and treatment system 18, the syngas 17 from the quench unit 14 may enter the scrubber 19 where the syngas 17 may be further cooled to remove entrained water and/or remaining particulates. The scrubbed syngas 21 may exit the scrubber 19 and enter an acid gas removal system 20 where acid gases, such as carbon dioxide and hydrogen sulfide. Within the gas cooling and treatment system 18, sulfur components 22 may be removed and sent to a sulfur production system 23 for purification. Water also may be removed as a steam 24 and a liquid 25. The steam 24 may be recycled to the gasifier 11 and/or sent to a heat recovery steam generator (HRSG) system 26. The liquid water 25 may be sent to a water treatment system 27.

The gas cooling and treatment system 18 may produce sweetened syngas 28, which may be directed to a combustor 29 where the syngas 28 is combusted to generate power within the "topping" cycle. Air 30 may be provided to the combustor 29 from a compressor 31 to mix with the syngas 28 in a fuel-air ratio for combustion. Further, the combustor 29 may receive nitrogen 32 from the air separator 12 via a diluent nitrogen compressor 33 to cool the combustion reaction.

Exhaust 34 from the combustor 29 may flow through a turbine 35, which may drive the compressor 31 and/or an electrical generator 36 and produce exhaust 37. The exhaust 37 may then be directed to the HRSG system 26, which may recover heat from the exhaust 37 and from the steam 24 fed from the gas cooling and treating system 18. The recovered heat may be used to drive a steam turbine 38 to generate power within the "bottoming" cycle. For example, the steam turbine 38 may drive a generator 39 to generate electricity. Steam 40 from the steam turbine 38 may then be directed to a condenser 41, where the steam may be cooled by cooling fluid 42 from a cooling tower 43. The condensed steam 44 from the condenser 41 may then be recycled to the HRSG system 26.

As may be appreciated, the power generation system 8 is provided by way of example only and is not intended to be limiting. The flow damping mechanisms described herein may be employed within the quench unit 14 and/or the scrubber 19 to dampen flow fluctuations. However, in other embodiments, the flow damping mechanisms may be employed within any type of gasification quench unit and/or scrubber. For example, the flow damping mechanisms may be employed within a quench unit or scrubber designed to provide syngas to a gas turbine without an HRSG system. In another example, the flow damping mechanisms may be employed within a quench unit or scrubber that is part of a separate gasification system.

Figure 2:
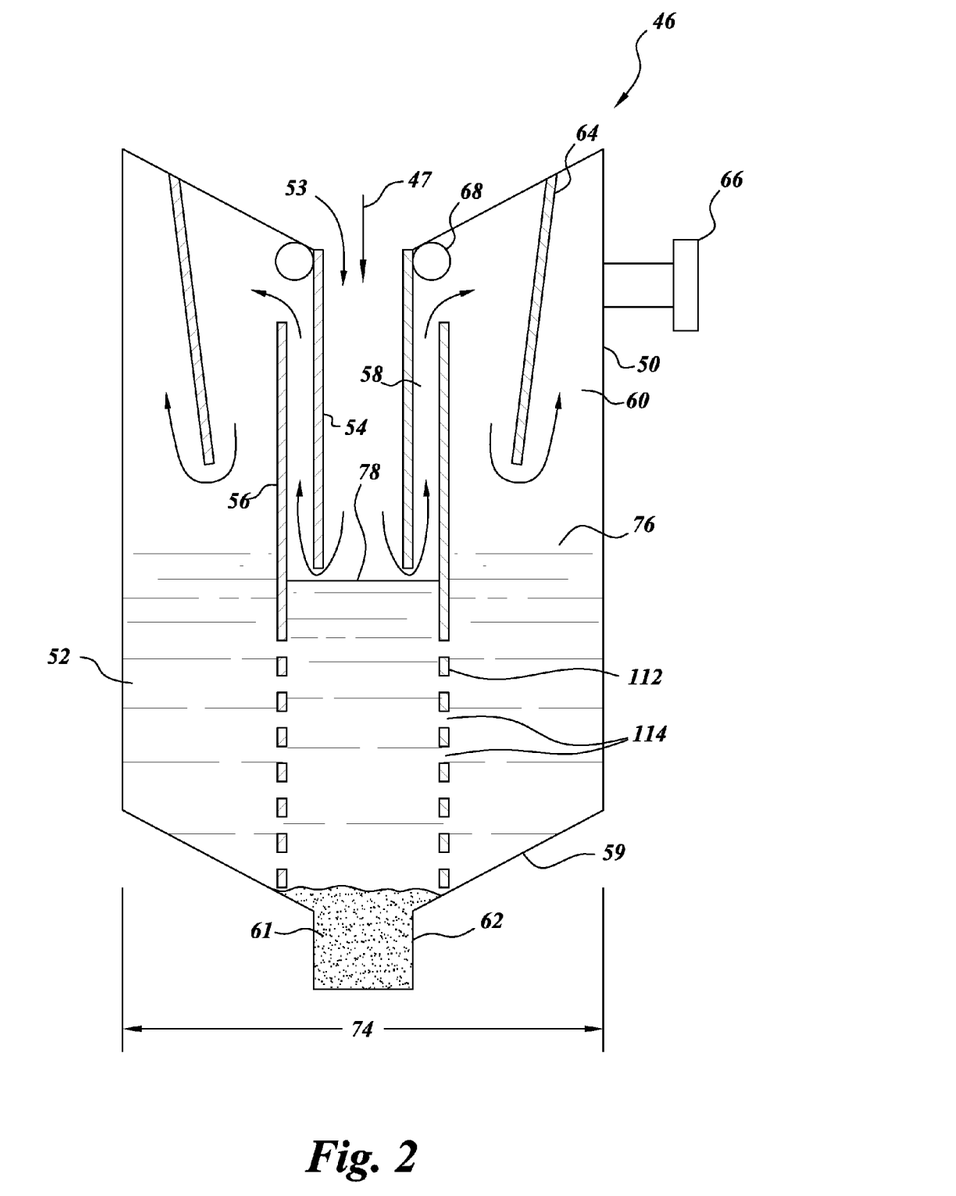
FIG. 2 is a front cross-sectional view of an embodiment of the gasification system component of FIG. 1 employing a perforated draft tube extension.
Figure 3:
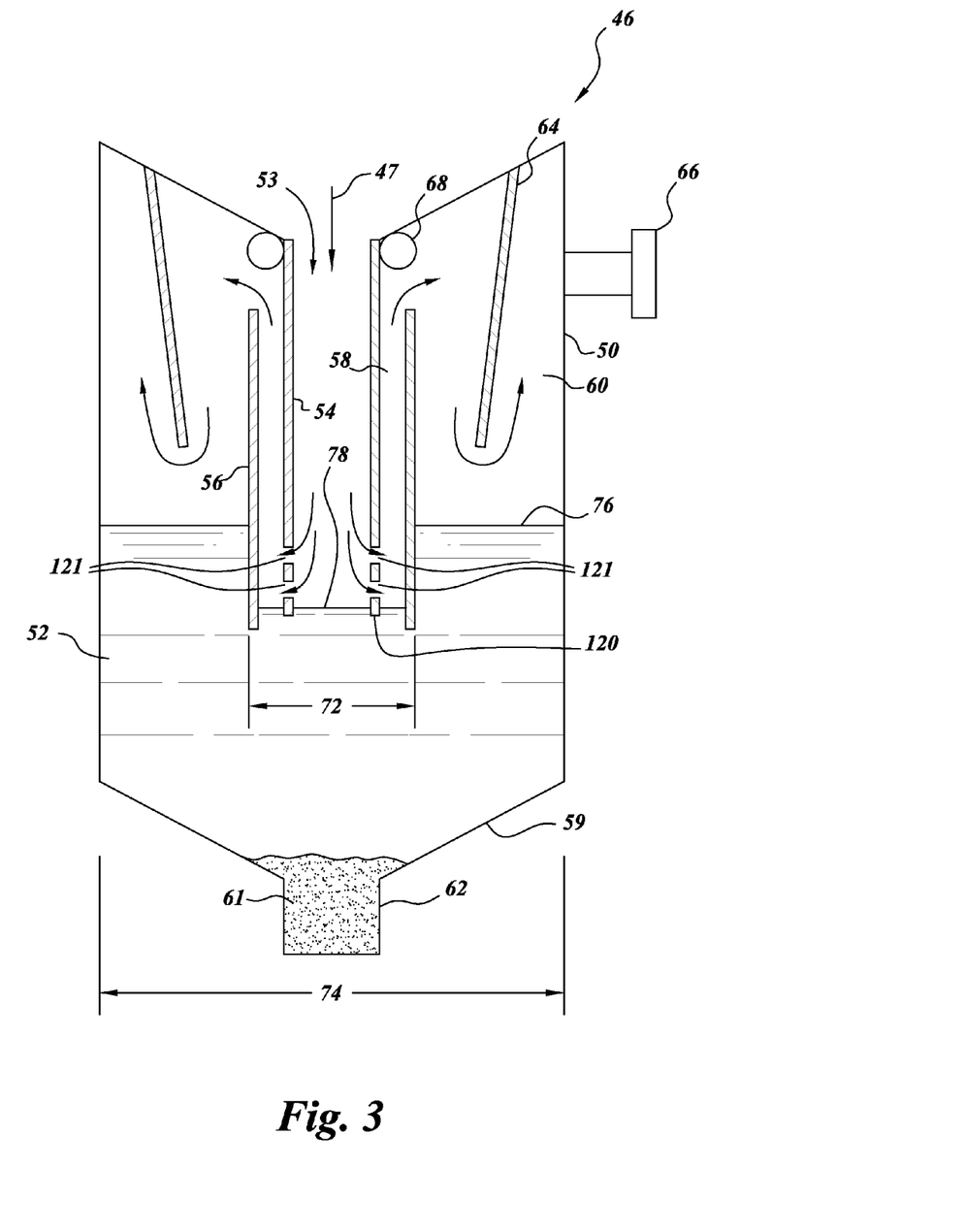
FIG. 3 is a front cross-sectional view of an embodiment of a gasification system component of FIG. 1 employing a perforated dip tube.

FIGS. 2-3 depict embodiments of a gasification system component 46. The gasification system component 46 may represent the quench unit 14 or the scrubber 19 shown in FIG. 1, as well as other types of gasification quench units and/or scrubbers. Moreover, although FIGS. 2-3 are generally described in the context of a quench unit, the flow damping mechanisms shown in these figures may be applied in a similar manner within a gasification scrubber.

FIG. 2 depicts a flow damping mechanism disposed between the inner chamber 58 and the outer chamber 60. Specifically, the draft tube 56 may include an extension 112 that provides a flow restriction between the inner chamber 58 and the outer chamber 60 within and/or just above the conical section 59. The extension 112 connects the draft tube 56 to the conical section 59 of the vessel 50. The extension 112 may be an annular structure with a diameter corresponding to the diameter of the draft tube 56. Holes 114 may be included within the extension 112 to allow passage of the cooling fluid between the inner chamber 58 and the outer chamber 60. The holes 114 may serve to restrict the flow of fluid between the inner and outer chambers 58 and 60. The holes 114 may be of a sufficient size to inhibit plugging of the holes 114 by the slag 16 that may collect within the bottom of the vessel 50 and the discharge port 62. Further, the number and/or the sizes of the holes 114 may be varied to adjust the amount of damping provided by the extension 112.

In summary, FIG. 2 herein, as well as FIGS. 2-12 from application Ser. No. 12/495,439, generally depict flow damping mechanisms disposed within the cooling fluid pool 52 in the outer chamber 60 and/or between the inner chamber 58 and the outer chamber 60. These flow damping mechanisms may be designed to reduce flow fluctuations by restricting flow of the cooling fluid 52 within the vessel 50. However, in other embodiments, flow damping mechanisms may be disposed in the inner chamber 58 to affect the flow of the syngas 47 and/or the cooling fluid 52 flowing through the inner chamber 58. In particular, the flow restrictions described in FIGS. 13-17 from application Ser. No. 12/495,439, may be designed to increase or decrease the pressure drop that occurs across the inner chamber 58. In certain embodiments, the flow damping mechanisms may be designed to increase the pressure drop, thereby limiting the flow fluctuations. However, in other embodiments, the flow damping mechanisms may be designed to decrease the pressure drop.

FIG. 3 depicts another embodiment of the gasification system component 46 with a dip tube 54 that includes a perforated section 120. Specifically, the perforated section 120 may include a series of holes 121 disposed circumferentially around the dip tube 54 in one or more rows. The holes 121 may permit the syngas to flow through the perforations in the dip tube, which may alter the flow profile of the gas through the inner chamber 58. Specifically, a portion of the syngas 47 may flow directly through the walls of the dip tube 54 into the inner chamber 58 bypassing the lower portions of the inner chamber 58 that includes the pool of cooling fluid 52. The perforations may allow multiple flow paths of the syngas along the length of the dip tube 54 rather than directing the syngas along the bottom annular circumference of the dip tube 54. The holes 121 may be of a sufficient size to inhibit plugging of ash depositions. Moreover, as the cooling fluid pool level 78 rises, the holes 121 may allow the cooling fluid 52 to flow through the holes 121 into the inner chamber 58. In other words, as the level 78 of the cooling fluid 52 rises to encompass the dip tube 54, the syngas 47 may flow into the inner chamber 58 through the upper row of holes 121 while the water may flow through the lower rows of holes 121. Any number of rows of holes 121 may be included. Furthermore the diameter and number of holes may vary.

The flow damping mechanisms depicted in FIGS. 2-3 herein and in FIGS. 2-18 of U.S. patent application Ser. No. 12/495,439, may be employed separately or in combination with one another. Moreover, as may be appreciated, the relative sizes, shapes, and geometries of the flow damping mechanisms may vary. Further, certain components, such as the draft tube 56 and/or the quench ring 68 may be omitted. The flow damping mechanisms may be employed in the gasification system component 46 during the initial manufacturing, or the flow damping mechanisms may be retrofit into existing gasification system components 46. Further, the flow damping mechanisms may be adjusted based on operational parameters, such as the type of carbonaceous fuel, the system efficiency, the system load, or environmental conditions, among others to achieve the desired amount of flow damping.

In accordance with the exemplary embodiments further disclosed herein, an improved gasification quench chamber dip tube is disclosed. Aspects of the invention focus on the design of the dip tube at the discharge end and improvements in the dynamic behavior of the water (coolant) in the quench chamber in conjunction with the gas flow resulting syngas flow, pressure, and/or water level fluctuations. With increased dynamics the water level fluctuation inside the dip tube is increased. Aspects of the invention provide a defined flow area with a soft change in the discharge coefficient with the changes in water level in the dip tube. Aspects of the invention improve fluid dynamics; reduce chances of plugging at the dip tube; and/or, improve uniformity of air/gas distribution. Specific embodiments are discussed in greater detail herein including further reference to FIGS. 4-12.

Figure 4:
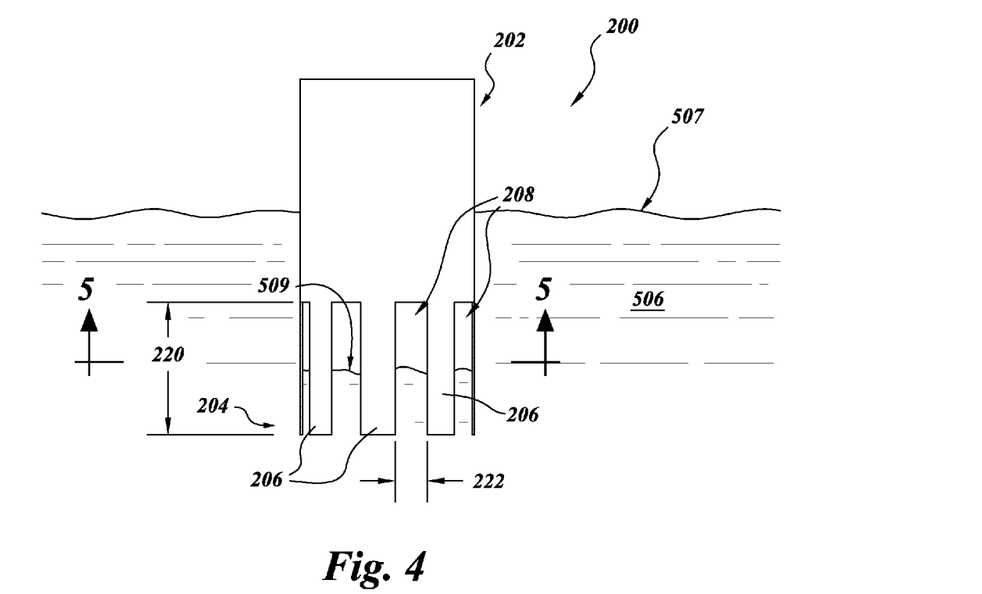
FIG. 4 is a side elevation view of quench chamber dip tube in accordance with an exemplary embodiment of the present invention.

FIG. 4 is a side elevation view of a quench chamber dip tube in accordance with an exemplary embodiment of the present invention. The quench chamber dip tube, or dip tube, 200 includes an elongate hollow member having a first intake end 202 and a second discharge end 204 which is located distally from the first intake end 202. As shown, the second discharge end 204 may include a plurality of elongate elements 206 that are displaced circumferentially around the elongate hollow element and extend axially from the second discharge end 204. The plurality of elongate elements 206 has a length 220. By being displaced around the elongate hollow element, the plurality of elongate elements 206 define a plurality of spaces, or elongate slots, 208 circumferentially around the elongate hollow element having a width 222.

Figure 5:
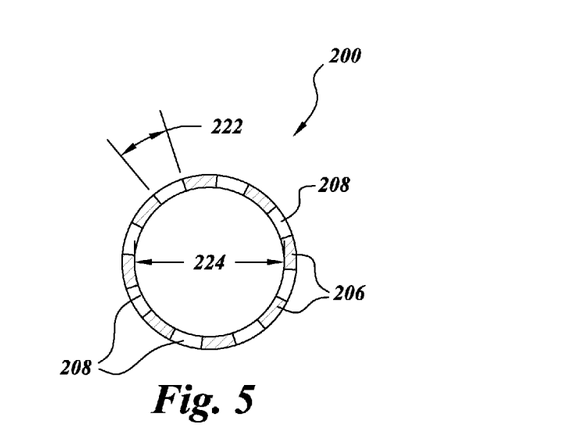
FIG. 5 is bottom sectional view of the quench chamber dip tube in FIG. 4.

As shown in the bottom sectional view depicted in FIG. 5, the plurality of elongate elements 206 may be distributed uniformly around the circumference of the second discharge end 204. The elongate hollow element has a diameter 224.

Figure 12:
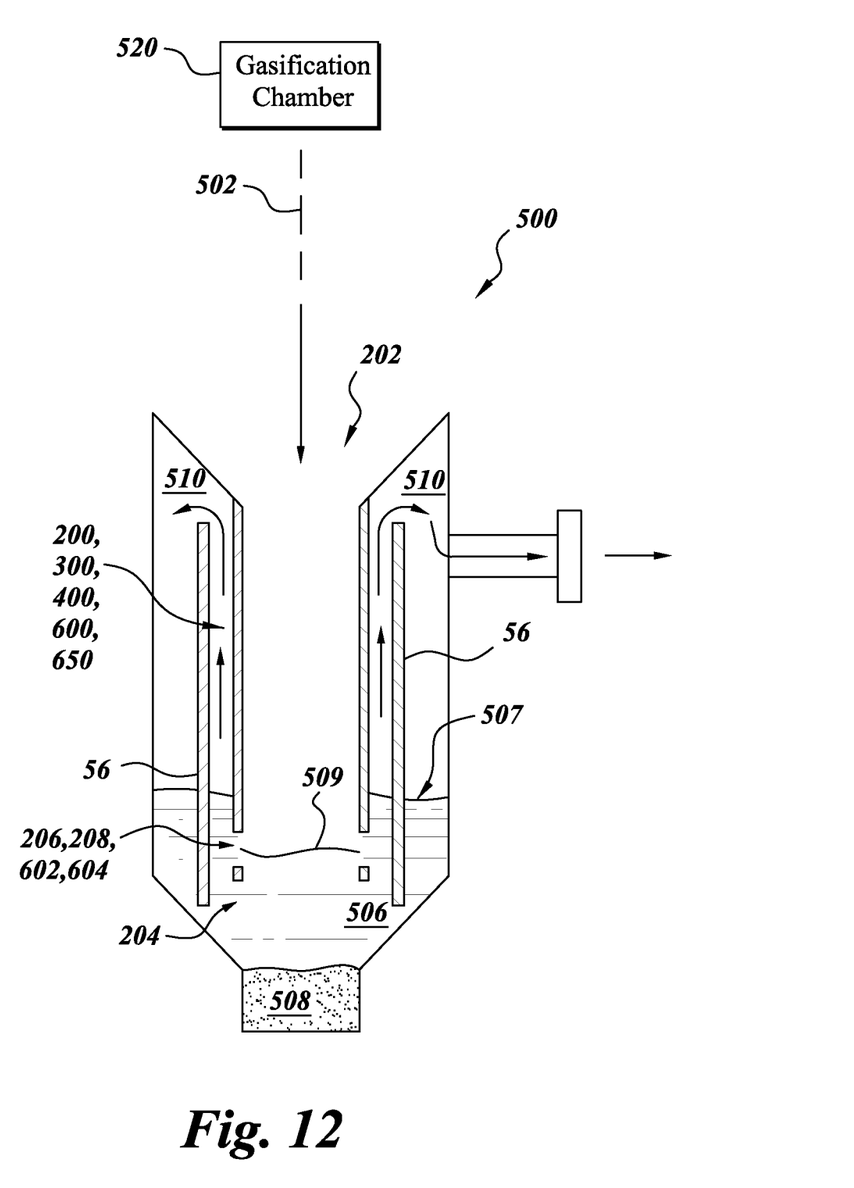
FIG. 12 is a sectional elevation view of a quench chamber and dip tube assembly in accordance with an exemplary embodiment of the present invention.

The dip tube 200 in FIG. 4 is located such that the second discharge end 204 is placed within the coolant (e.g., water) 506 in the quench chamber 500 (see e.g., FIG. 12). The coolant 506 has a coolant level 507 outside of the dip tube 200. Contrastingly, due the inflow of syngas through the dip tube 200, the coolant 506 has a level 509 within the dip tube 200 that is often different, and lower, than the coolant level 507. By locating the plurality of elongate elements 206 and their concomitant adjacent elongate slots as shown, the difference in coolant levels 507, 509 and the dynamic effect of the fluctuation in coolant levels 507, 509 is mitigated. Thus, the change in water flow through the annulus depending on the change in water level will be made more gradual, thereby suppressing fluid dynamics.

Although the plurality of elongate elements 206, and adjacent slots 208, in FIG. 4 are shown to be rectangular in shape, clearly other shapes may be used. For example, the plurality elongate elements 206 may alternatively be ovoid, ellipsoid, circular, and combinations thereof. Similarly, although a quantity of the plurality of elongate elements 206 is shown in FIG. 5 as eight (8), other quantities may be used. For example, a quantity of the plurality of elongate elements 206 may be five (5) or more. The length 220 of the plurality of elongate elements 206 may be at least about 4 inches long. Any suitable length that aids in lessening the effects of fluid dynamics caused by fluctuation in coolant levels 507, 509 and/or improves the uniform distribution of air and/or syngas may be employed herein.

Figure 6:
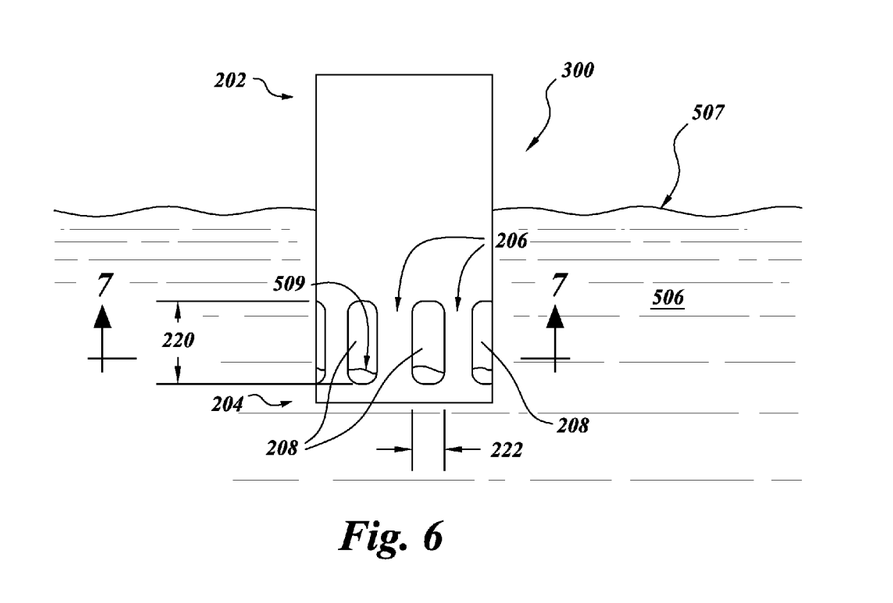
FIG. 6 is a side elevation view of quench chamber dip tube in accordance with an exemplary embodiment of the present invention.

FIG. 6 is a side elevation view of a quench chamber dip tube in accordance with another exemplary embodiment of the present invention. The quench chamber dip tube, or dip tube, 300 includes an elongate hollow member having a first intake end 202 and a second discharge end 204 which is located distally from the first intake end 202. As shown, the second discharge end 204 may include a plurality of elongate openings 208 that are displaced circumferentially around the elongate hollow element at the second discharge end 204. The plurality of elongate openings 208 have a length 220 and a width 222.

Figure 7:
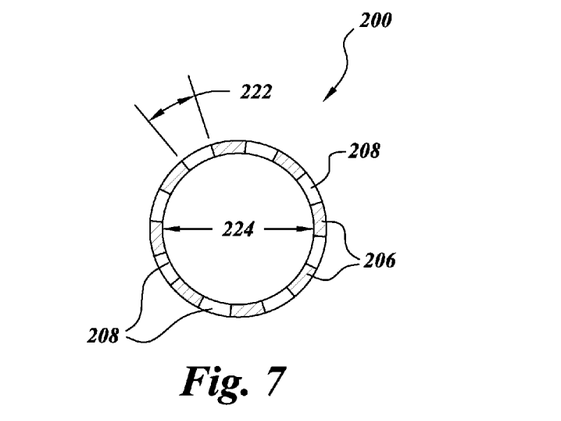
FIG. 7 is bottom sectional view of the quench chamber dip tube in FIG. 6.

As shown in the bottom sectional view depicted in FIG. 7, the plurality of elongate openings 208 may be distributed uniformly around the circumference of the second discharge end 204. The elongate hollow element has a diameter 224.

The dip tube 300 in FIG. 6 is located such that the second discharge end 204 is placed within the coolant (e.g., water) 506 in the quench chamber 500 (see e.g., FIG. 12). The coolant 506 has a coolant level 507 outside of the dip tube 300. Contrastingly, due the inflow of syngas through the dip tube 300, the coolant 506 has a level 509 within the dip tube 300 that is often different, and lower, than the coolant level 507 outside of the dip tube 300. By locating the plurality of openings 208 as shown, the difference in coolant levels 507, 509 and the dynamic effect of the fluctuation in coolant levels 507, 509 is mitigated. Thus, the change in water flow through the annulus depending on the change in water level will be made more gradual, thereby suppressing fluid dynamics.

Although the plurality of elongate openings 208 in FIG. 6 are shown to be ovoid in shape, clearly other shapes may be used. For example, the plurality elongate openings 208 may alternatively be rectangular, ellipsoid, circular, and combinations thereof. Similarly, although a quantity of the plurality of openings 208 is shown in FIG. 7 as eight (8), other quantities may be used. For example, a quantity of the plurality of elongate openings may be five (5) or more. The length 220 of the plurality of elongate openings 208 may be at least about 4 inches long. Any suitable length that aids in lessening the effects of fluid dynamics caused by fluctuation in coolant levels 507, 509 and/or improves the uniform distribution of air and/or syngas may be employed herein.

Figure 8:
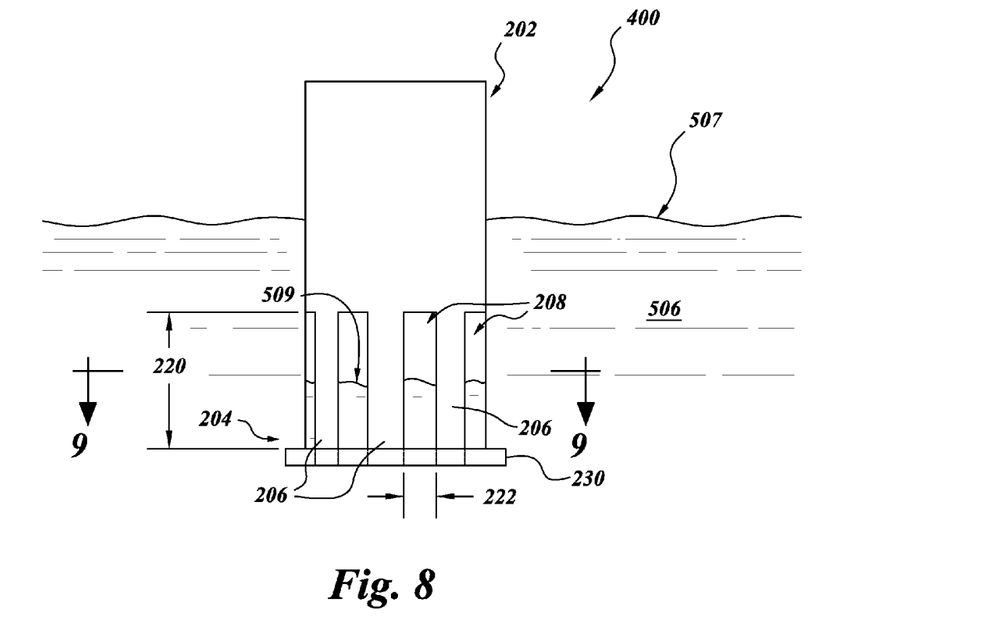
FIG. 8 is a side elevation view of quench chamber dip tube in accordance with an exemplary embodiment of the present invention.

FIG. 8 is a side elevation view of a quench chamber dip tube in accordance with still another exemplary embodiment of the present invention. The quench chamber dip tube, or dip tube, 400 includes an elongate hollow member having a first intake end 202 and a second discharge end 204 which is located distally from the first intake end 202. As shown, the second discharge end 204 may include a plurality of elongate openings 208 that are displaced circumferentially around the elongate hollow element at the second discharge end 204. The plurality of elongate openings 208 have a length 220 and a width 222. In this embodiment the elongate openings 208 are defined by the placement of a structural ring 230 along the second discharge end 204 of the elongate hollow member.

Figure 9:
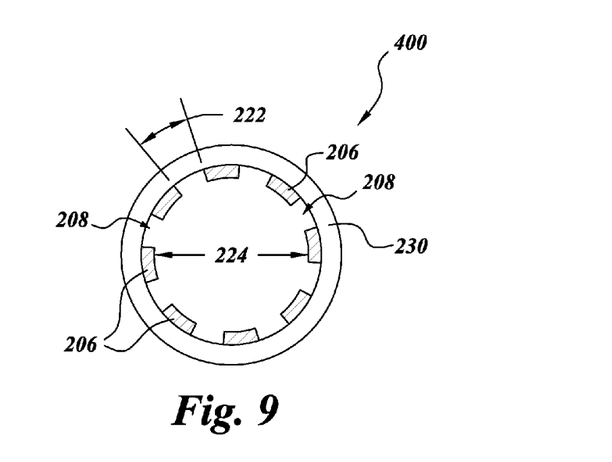
FIG. 9 is top sectional view of the quench chamber dip tube in FIG. 8.

As shown in the top sectional view depicted in FIG. 9, the plurality of elongate openings 208 may be distributed uniformly around the circumference of the second discharge end 204. The elongate hollow element has a diameter 224.

The dip tube 400 in FIG. 8 is located such that the second discharge end 204 is placed within the coolant (e.g., water) 506 in the quench chamber 500 (see e.g., FIG. 12). The coolant 506 has a coolant level 507 outside of the dip tube 400. Contrastingly, due the inflow of syngas through the dip tube 400, the coolant 506 has a level 509 within the dip tube 400 that is often different, and lower, than the coolant level 507 outside of the dip tube 400. By locating the plurality of openings 208 as shown, the difference in coolant levels 507, 509 and the dynamic effect of the fluctuation in coolant levels 507, 509 is mitigated. Thus, the change in water flow through the annulus depending on the change in water level will be made more gradual, thereby suppressing fluid dynamics.

Although the plurality of elongate openings 208 in FIG. 8 are shown to be rectangular in shape, clearly other shapes may be used. For example, the plurality elongate openings 208 may alternatively be ovoid, ellipsoid, circular, and combinations thereof. Similarly, although a quantity of the plurality of openings 208 is shown in FIG. 9 as eight (8), other quantities may be used. For example, a quantity of the plurality of elongate openings may be five (5) or more. The length 220 of the plurality of elongate openings 208 may be at least about 4 inches long. Any suitable length that aids in lessening the effects of fluid dynamics caused by fluctuation in coolant levels 507, 509 and/or improves the uniform distribution of air and/or syngas may be employed herein.

Similarly, the use of the structural ring 230 may vary without departing from the invention. For example, the structural ring 230 may be located along the exterior of the elongate hollow element, as shown in FIGS. 8 and 9, or it may be located along the interior of the elongate hollow element. Similarly, the structural ring 230 in some embodiments may be located in positions other than the extreme end of the second discharge end 204. For example, the structural ring 230 may be located part way up the second discharge end 204, thereby defining a plurality of openings and a plurality of elongate elements at the second discharge end. Similarly, multiple structural rings may be employed. Further, the structural ring does not necessarily fully surround the elongate hollow element. For example, structural ring may comprise ribbing and/or a perannular element(s) so as to increase the strength and structural integrity off the second discharge end 204 near any elongate openings.

Figure 10:
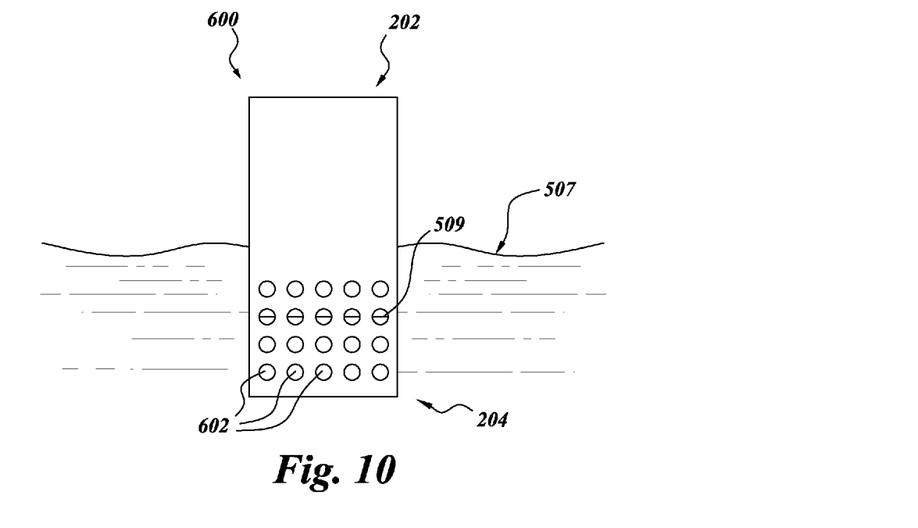
FIG. 10 is a side elevation view of quench chamber dip tube in accordance with an exemplary embodiment of the present invention.

FIG. 10 is a side elevation view of a quench chamber dip tube in accordance with another exemplary embodiment of the present invention. The quench chamber dip tube, or dip tube, 600 includes an elongate hollow member having a first intake end 202 and a second discharge end 204 which is located distally from the first intake end 202. As shown, the second discharge end 204 may include a plurality of openings or perforations 602 that are displaced circumferentially around the elongate hollow element at the second discharge end 204. The plurality of openings 602 may be distributed uniformly or nonuniformally around the circumference of the second discharge end 204. Different quantities, configurations and/or layouts of the openings 602 than those depicted in FIG. 10 may be used without departing from aspects of the present invention.

The dip tube 600 in FIG. 10 is located such that the second discharge end 204 is placed within the coolant (e.g., water) 506 in the quench chamber 500 (see e.g., FIG. 12). The coolant 506 has a coolant level 507 outside of the dip tube 600. Contrastingly, due the inflow of syngas through the dip tube 600, the coolant 506 has a level 509 within the dip tube 600 that is often different, and lower, than the coolant level 507 outside of the dip tube 600. By locating the plurality of openings 602 as shown, the difference in coolant levels 507, 509 and the dynamic effect of the fluctuation in coolant levels 507, 509 is mitigated. Thus, the change in water flow through the annulus depending on the change in water level will be made more gradual, thereby suppressing fluid dynamics.

Figure 11:
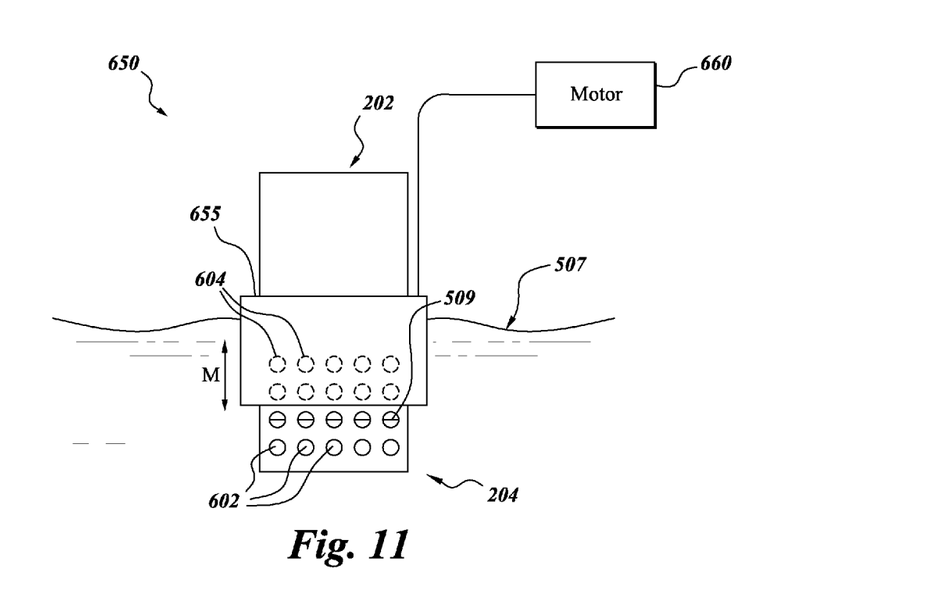
FIG. 11 is a side elevation view of quench chamber dip tube in accordance with an exemplary embodiment of the present invention.

FIG. 11 is a side elevation view of a quench chamber dip tube in accordance with another exemplary embodiment of the present invention. The quench chamber dip tube, or dip tube, 650 includes an elongate hollow member having a first intake end 202 and a second discharge end 204 which is located distally from the first intake end 202. As shown, the second discharge end 204 may include a plurality of openings or perforations 602 that are displaced circumferentially around the elongate hollow element at the second discharge end 204, similar to the embodiment shown in FIG. 10. The plurality of openings 602 may be distributed uniformly or nonuniformly around the circumference of the second discharge end 204. Different quantities, configurations (e.g., different rows and/or columns, etc.) and/or layouts of the openings 602 than those depicted in FIG. 11 may be used without departing from aspects of the present invention.

The dip tube 650 further includes a movable element 655. The movable element 655 is able to move up and down, as denoted by arrows M. To facilitate the movement of movable element 655, a motor 660 may be attached to the movable element 655. The movable element 655 may comprise a sleeve or cover that is configured to suitably block a portion of the openings, as denoted by 604. In this manner, with the aid of the motor 660, the movable element 655 is able to move up or down, as needed so as to change the quantity of available openings 602 that are open. In this manner the total area of openings between the inside of the dip tube 650 and the outside of the dip tube 650 is, effectively, made user-adjustable. It should be noted that other configurations of movable element are possible than that depicted in FIG. 11 without departing from aspects of the present invention. For example, the movable element 655 may be placed along the interior of the dip tube 650. Similarly, the movable element 655 may be used in consort with any of the dip tube configurations discussed herein.

The dip tube 650 in FIG. 11 is located such that the second discharge end 204 is placed within the coolant (e.g., water) 506 in the quench chamber 500 (see e.g., FIG. 12). The coolant 506 has a coolant level 507 outside of the dip tube 650. Contrastingly, due the inflow of syngas through the dip tube 650, the coolant 506 has a level 509 within the dip tube 650 that is often different, and lower, than the coolant level 507 outside of the dip tube 650. By locating the plurality of openings 602 as shown in consort with the use of the movable sleeve 655 and motor 660 to cover some of the openings 604, the difference in coolant levels 507, 509 and the dynamic effect of the fluctuation in coolant levels 507, 509 is mitigated. Thus, the change in water flow through the annulus depending on the change in water level will be made more gradual, thereby suppressing fluid dynamics.

FIG. 12 is a side elevation view of a gasification quench chamber 500 that includes a gasification dip tube 200, 300, 400, 600, 650 as described herein. As shown, syngas 502 produced upstream in a combustion chamber 520 is delivered via the first intake end 202 of the dip tube 200, 300, 400, 600, 650 and is discharged via the second discharge end 204 into the coolant 506 held in the gasification quench chamber 500. Syngas 510 that has been cooled by contact with coolant 506, leaves the quench chamber 500 at exit 504 for further processing. Portions of slag 508 are gathered in the bottom of the quench chamber 500. While the level 507 of coolant 506 outside the dip tube 200, 300, 400, 600, 650 is generally higher than the second discharge end 204 of the dip tube 200, 300, 400, 600, 650, the level 509 of the coolant 506 within the dip tube 200, 300, 400, 600, 650 is lower than the level 507. The plurality of elongate openings 208 and/or plurality of elongate elements 206 and/or plurality of openings 602 aid in providing uniform distribution in the flow and egress of the syngas 502 out of the dip tube 200, 300, 400, 600, 650 and upward in the quench chamber 500 towards the exit 504. Further, the location and configuration of plurality of elongate openings 208 and/or plurality of elongate elements 206 and/or plurality of openings 602 aid in reducing the effects of fluid dynamics caused by fluctuations in one or both of the coolant 506 levels 507, 509 and the relationship therebetween. As a result, ultimately, the performance of the quench chamber 500 and concomitantly the entire gasification system is improved.

In any event, aspects of the present invention provide a dip tube that include a plurality of elongate openings and/or a plurality of elongate elements that are ultimately configured to lessen fluid dynamics with the quench chamber. The size and configuration of the elongate elements and/or elongate openings may be configured so that the water level within the dip tube is with in the bounds or length of the elongate elements and/o elongate openings. For example, as shown in FIGS. 4, 6, 8, 10, 11 and 12, the dip tube 200, 300, 400, 600, 650 is designed to that the range of the elongate openings 208 and/or elongate elements 206 and/or openings 602 spans the water level 509 within the dip tube 200, 300, 400, 600, 650.

It should be noted that various configurations of quench chamber and dip tube can be employed without departing from aspects of the present invention. For example, although certain figures herein (e.g., FIGS. 2, 3 and 12) depict a quench chamber having a dip and draft tube configuration, the quench chamber may alternatively have a dip tube-only configuration, a dip/draft with a quench ring configuration, and the like.

In accordance with one exemplary embodiment of the present invention, a gasification quench chamber component comprises: an elongate hollow element, having a first intake end and a second discharge end distally opposed thereon, wherein the second discharge end comprises one of: a plurality of elongate openings displaced circumferentially around the elongate hollow element; and a plurality of elongate elements displaced circumferentially around the elongate hollow element, thereby defining a plurality of elongate spaces therebetween, and extending axially from the second discharge end.

In accordance with another exemplary embodiment of the present invention, a gasification component comprises a quench chamber having a liquid coolant disposed therein; a dip tube configured to couple a combustion chamber to the quench chamber and configured to direct syngas from the combustion chamber to the quench chamber to contact the liquid coolant and produce a cooled syngas, further wherein the dip tube comprises a first intake end and a second discharge end distally opposed thereon, wherein the second discharge end comprises one of: a plurality of elongate openings displaced circumferentially around the elongate hollow element; and a plurality of elongate elements displaced circumferentially around the elongate hollow element, thereby defining a plurality of elongate spaces therebetween, and extending axially from the second discharge end.

In accordance with another exemplary embodiment of the present invention, a gasification quench chamber component comprises an elongate hollow element, having a first intake end and a second discharge end distally opposed thereon, wherein the second discharge end comprises a plurality of holes through the hollow element spaced circumferentially around the second discharge end.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gasification component comprising:
    an elongate hollow element, having a first intake end and a second discharge end distally opposed thereon, wherein the second discharge end comprises:
        a plurality of elongate openings formed circumferentially around and through the elongate hollow element, surrounded on all sides by the elongate hollow element, and extending axially from the second discharge end;
    a movable element located at the second discharge end and coupled to a motor, wherein the movable element is movable along an axial direction of the elongate hollow element and configured to adjustably cover a portion of the plurality of elongate openings;
    a draft tube comprising an extension, disposed surrounding the elongate hollow element and defining an annular passage there between; and
    a vessel comprising a conical section, wherein the elongate hollow element and the draft tube are disposed within the vessel, wherein the extension of the draft tube is coupled to the conical section of the vessel.

2. The gasification component of claim 1, wherein a quantity of the plurality of elongate openings is at least five.

3. The gasification component of claim 1, wherein the plurality of elongate openings is configured to lessen fluid dynamics.

4. The gasification component of claim 1, further comprising a structural ring coupled to the second discharge end and disposed around the plurality of elongate openings.

5. The gasification component of claim 1, wherein a shape of the plurality of elongate openings is one of ovoid, ellipsoid, circular, rectangular, and combinations thereof.

6. The gasification component of claim 1, wherein the plurality of elongate openings is displaced uniformly around a circumference of the second discharge end.

7. The gasification component of claim 1, wherein the plurality of elongate openings is configured to extend to span over a water level within the elongate hollow element.

8. The gasification component of claim 1, wherein the extension further comprises a plurality of holes to allow passage of a cooling fluid.

9. The gasification component of claim 1, wherein the plurality of elongate openings have a size of about 4 inches.

* * * * *